United States Patent [19]
Urnes et al.

[11] Patent Number: 5,919,267
[45] Date of Patent: Jul. 6, 1999

[54] NEURAL NETWORK FAULT DIAGNOSTICS SYSTEMS AND RELATED METHOD

[75] Inventors: James M. Urnes, Bridgeton; William E. Bond, St. Louis, both of Mo.

[73] Assignee: McDonnell Douglas Corporation, St. Louis, Mo.

[21] Appl. No.: 08/833,770

[22] Filed: Apr. 9, 1997

[51] Int. Cl.[6] .................................................. G06F 13/00
[52] U.S. Cl. ........................ 714/26; 714/38; 395/183.14
[58] Field of Search ........................ 395/183.02, 183.14, 395/183.13; 06/10, 23, 25

[56] References Cited

U.S. PATENT DOCUMENTS

| | | | |
|---|---|---|---|
| 4,162,438 | 7/1979 | Osder | 318/564 |
| 5,099,436 | 3/1992 | McCown et al. | 364/550 |
| 5,130,936 | 7/1992 | Sheppard et al. | 364/551.01 |
| 5,465,321 | 11/1995 | Symth | 395/22 |
| 5,483,147 | 1/1996 | Ilic et al. | 322/25 |
| 5,680,513 | 10/1997 | Hyland et al. | 395/21 |
| 5,796,920 | 8/1998 | Hyland et al. | 395/22 |

*Primary Examiner*—Robert W. Beausoliel, Jr.
*Assistant Examiner*—Norman Michael Wright
*Attorney, Agent, or Firm*—Westerlund & Powell, P.C.; Robert A. Westerlund; Raymond H.J. Powell, Jr.

[57] ABSTRACT

A fault diagnostics system for monitoring the operating condition of a host system, e.g., an aircraft, which includes a plurality of subsystems. The fault diagnostics system is preferably implemented in software running on a high-speed neural network processor. The fault diagnostics system constructs a neural network model of the performance of each subsystem in a normal operating mode and each of a plurality of different possible failure modes. The system preferably dynamically predicts the performance of each subsystem based upon the response of each of the neural network models to dynamically changing operating conditions, compares the actual performance of each subsystem with the dynamically predicted performance thereof in each of the normal and possible failure modes, and determines the operating condition of the host system on the basis of these comparisons. In a preferred embodiment, the determining step is carried out by performing a statistical analysis of the comparisons made in the comparing step, e.g., by emloying a comparison voting technique. A related method is also disclosed.

20 Claims, 3 Drawing Sheets

NEURAL NETWORK FAULT DIAGNOSTICS SYSTEMS AND RELATED METHOD

This invention was made under contract no. MDA 972-94-3-0014, Order No. B310 awarded by ARPA/MDA. The Government has certain rights to this invention.

BACKGROUND OF THE INVENTION

The present invention relates generally to the field of fault diagnostics, and, more particularly, to a fault diagnostics system which employs a neural network processor, and a related method.

Large systems which are comprised of a plurality of different components or subsystems are susceptible to failures due to a fault in any one (or more) of the components or subsystems thereof. Each type of failure is referred to as a "failure mode". Fault diagnostics systems are utilized in such systems to detect any failures of the system and to diagnose the source of any such detected failures or faults. Fault diagnostics systems ideally should be capable of quickly and accurately diagnosing the source of a fault. Inability to quickly identify the source of a fault can lead to unnecessary component replacement and/or excessive down time of the faulty system. Inaccurate identification of the source of a fault can lead to unnecessary replacement of good components.

An exemplary system in which the fault diagnostics system is of paramount importance is an aircraft. Support and maintenance costs can be a dominant factor in the high life cycle costs of an aircraft. The various subsystems of an aircraft, such as the flight control subsystem, are quite complex. Identifying the source of a fault in such complex subsystems requires a quite sophisticated fault diagnostics system.

The best time to diagnose a fault is during flight, when complete data relating to the fault is available. Post-flight troubleshooting can be time-consuming and often results in unnecessary replacement of good components, which are usually quite expensive. Inability to quickly identify the source of the fault can result in excessive aircraft down time and even loss of a scheduled mission.

Current fault diagnostics systems for commercial and military aircraft include built-in-test software for each of the major subsystems of the aircraft. Such built-in-test software utilizes a separate model for each subsystem or more than one operating component for comparison voting. Either approach entails high development costs. Moreover, current fault diagnostics systems for aircraft have average error rates of 40%–50%, due to the small tolerances between normal and failed conditions of the components.

Based on the above, there presently exists a need in the art for a fault diagnostics system which overcomes the above-described drawbacks and shortcomings of the currently available fault diagnostics systems. The present invention fulfills this need in the art.

SUMMARY OF THE INVENTION

The present invention encompasses a fault diagnostics system for monitoring the operating condition of a host system, e.g., an aircraft, which includes a plurality of subsystems. The fault diagnostics system is preferably implemented in software running on a high-speed neural network processor. The fault diagnostics system constructs a neural network model of the performance of each subsystem in a normal operating mode and each of a plurality of different possible failure modes. The system preferably dynamically predicts the performance of each subsystem based upon the response of each of the neural network models to dynamically changing operating conditions, compares the actual performance of each subsystem with the dynamically predicted performance thereof in each of the normal and possible failure modes, and determines the operating condition of the host system on the basis of these comparisons.

In a preferred embodiment, the determining step is carried out by performing a statistical analysis of the comparisons made in the comparing step, e.g., by emloying a comparison voting technique. The comparing and determining steps are preferably carried out by making a plurality of comparisons between the actual performance of each subsystem and the modeled performance of the normal operating mode thereof, during a prescribed first time interval, determining, for each subsystem, whether or not there is a prescribed level of agreement between a prescribed percentage of the comparisons made during the prescribed first time interval, and indicating that the operating condition of the respective subsystem is normal if there is the prescribed level of agreement, making a plurality of comparisons between the actual performance of each subsystem determined to have a fault and the modeled performance of each failure mode thereof, during successive prescribed time intervals, and determining, for each subsystem, whether or not there is a prescribed level of agreement between a prescribed percentage of the comparisons made during each of the successive second time intervals, and indicating the particular failure mode, if any, which is determined to have occurred.

The present invention also encompasses a related method for monitoring the operating condition of a host system which includes a plurality of subsystems.

BRIEF DESCRIPTION OF THE DRAWINGS

The above and other objects, features, and advantages of the present invention will become apparent from the following detailed description taken in conjunction with the accompanying drawings, in which.

DETAILED DESCRIPTION OF THE INVENTION

While the present invention is described herein with reference to illustrative embodiments for particular applications, it should be understood that the present invention is not limited thereto. Those having ordinary skill in the art and access to the teachings provided herein will recognize additional modifications, applications, and embodiments within the scope thereof and additional fields in which the present invention would be of significant utility.

In overview, the fault diagnostics system of the present invention utilizes a neural network processor which accurately models the normal operating condition and each failure condition or "failure mode" of each subsystem being monitored. More particularly, a neural network performance model of the normal operating mode (i.e., no-fault condition) and each failure mode (i.e., fault condition) of each subsystem being monitored is constructed. The neural network processor is preferably implemented in software run on a high speed digital processor, such as a CNAPS processor, which can process up to 1,000 neural networks in a 20 Hz time frame. Component sensors are preferably utilized to monitor selected operating characteristics of the various subsystems, and to generate feedback signals which are indicative of actual subsystem performance. The data input to the neural network processor consists of commands issued by the digital processor and feedback signals generated by the component sensors in response to the commands.

During operation of the fault diagnostics system, for each subsystem being monitored, the actual subsystem performance is compared with the performance predicted by each of the subsystem performance models and a determination is made on the basis of these comparisons of the operating condition of that subsystem. Comparison voting and other statistical data analysis techniques can be employed to maximize fault-detection accuracy and to minimize the rate of "false alarms" (i.e., spurious fault detections).

Figure 1:
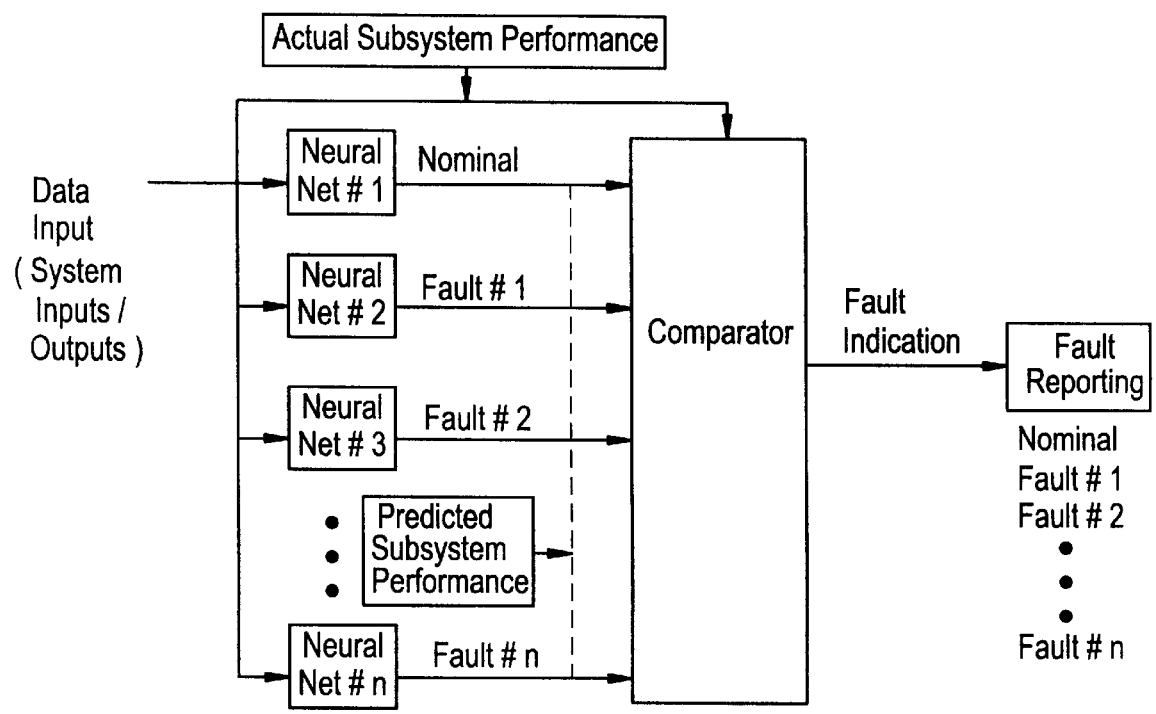
FIG. 1 is a block diagram which depicts the functionality of a representative subsystem-monitoring portion of the fault diagnostics system of a preferred embodiment of the present invention.

With reference now to FIG. 1, there can be seen a block diagram which depicts the functionality of a representative subsystem-monitoring portion of the fault diagnostics system of a preferred embodiment of the present invention. It will be appreciated that the fault diagnostics system includes a similar portion for each subsystem of the system being monitored. In the preferred embodiment of the present invention, a neural network model of the normal operating mode (i.e., no-fault condition) and each failure mode (i.e., fault condition) of each subsystem being monitored is constructed. Thus, there as many neural networks (e.g., "Neural Net # 1 Neural—Net # n") as there are normal operating modes and failure modes for each monitored subsystem. Data obtained from normal and failure mode tests of the subsystems is used to train the neural networks. Data obtained by simulation of the actual operation of the hardware can also be used to train the neural networks. New neural networks can be constructed to support additional fault modes or changes in system operation.

To further improve the accuracy of the fault diagnostics system, in the preferred embodiment, the subsystem performance for the normal operating condition and for each failure mode is continually predicted (i.e., dynamically modeled) by determining the response of each neural network model to dynamically changing data inputs, i.e., the commands issued by the digital processor to the various subsystem components and the subsystem component sensor feedback signals generated in response thereto. The actual subsystem performance is also continually determined by the neural network processor on the basis of the component sensor feedback signals. The digital processor (or other "Comparator" logic) can then compare the dynamically predicted subsystem performance for each failure mode and for the normal operating mode with the actual subsystem performance and make a more accurate determination of the operating condition of each subsystem.

In the preferred embodiment, the following comparison voting technique is utilized to maximize fault-detection accuracy. More particularly, for each subsystem, a plurality of comparisons of actual versus predicted subsystem performance for the normal operating mode (nominal operation) are made during a prescribed time interval. If a majority (or other threshold amount) of the comparisons within the prescribed time interval indicate that the actual subsystem performance is normal, then normal operation of that subsystem is assumed. On the other hand, if a majority (or other threshold amount) of the comparisons within the prescribed time interval indicate that the actual subsystem performance deviates from the predicted subsystem performance by a prescribed amount, then the actual subsystem performance is compared with the predicted subsystem performance for each failure mode of that subsystem. If a prescribed level of agreement is found between the actual subsystem performance and one of the failure modes, then that subsystem is assumed to be experiencing that particular failure mode. If the prescribed level of agreement is not found between the actual subsystem performance and any one of the failure modes, then an out-of-nominal or unknown failure mode is registered. In this way, the fault diagnostics system can detect failure modes (faults) for which it has not been trained to detect. This failure mode can then be added to the system by using the failure mode data to train and add another neural network fault model.

Figure 2:
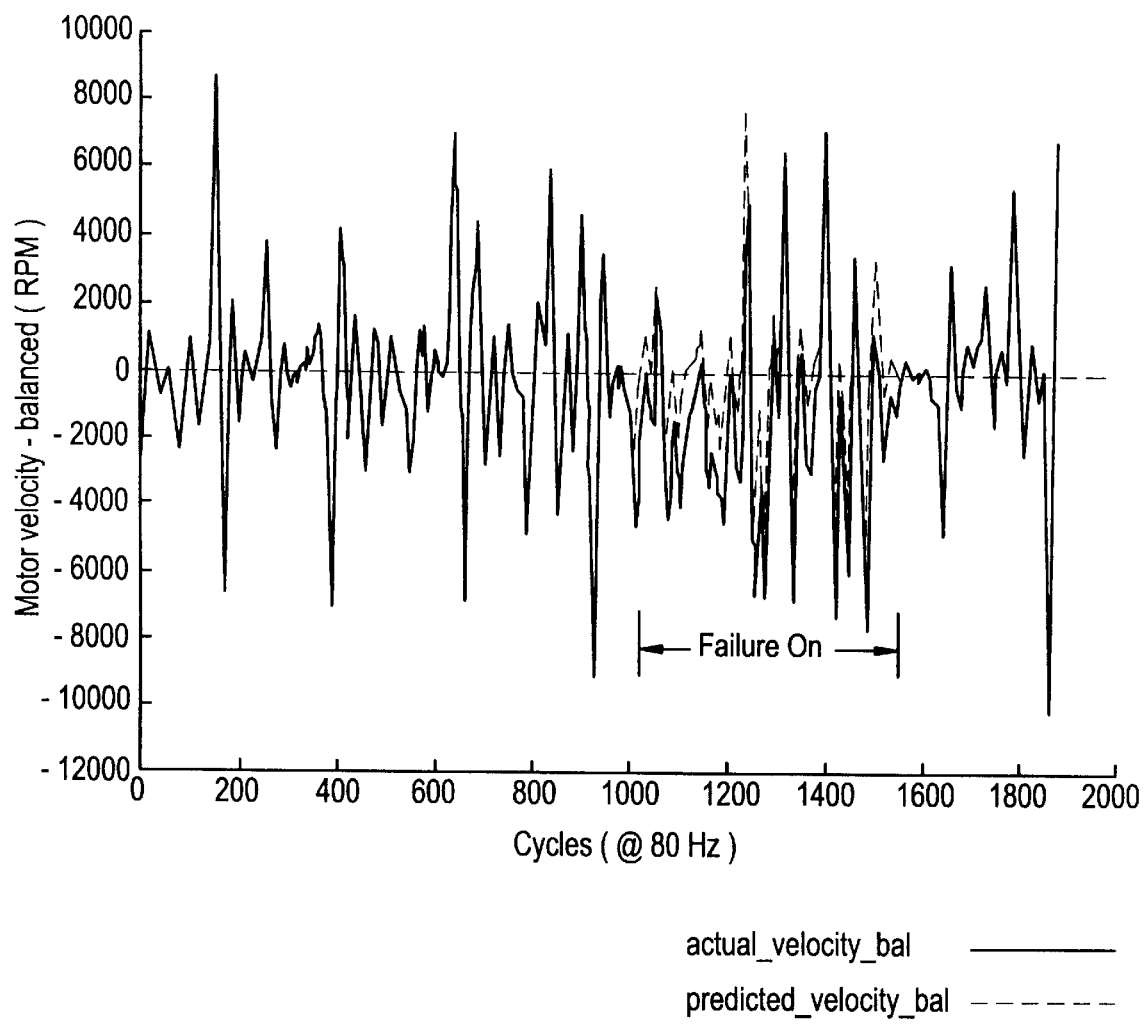
FIG. 2 is a graph which depicts the actual motor velocity versus the motor velocity predicted by a neural network performance model for a normal (no-fault) operating mode of an electric actuator which constituted the host system for a test version of a neural network fault diagnostics system constructed in accordance with the teachings of the present invention; and, FIG. 3 is a graph which depicts the actual motor velocity versus the motor velocity predicted by a neural network performance model for a pump failure mode of the electric actuator which constituted the host system for the test version of the neural network fault diagnostics system constructed in accordance with the teachings of the present invention.
Figure 3:
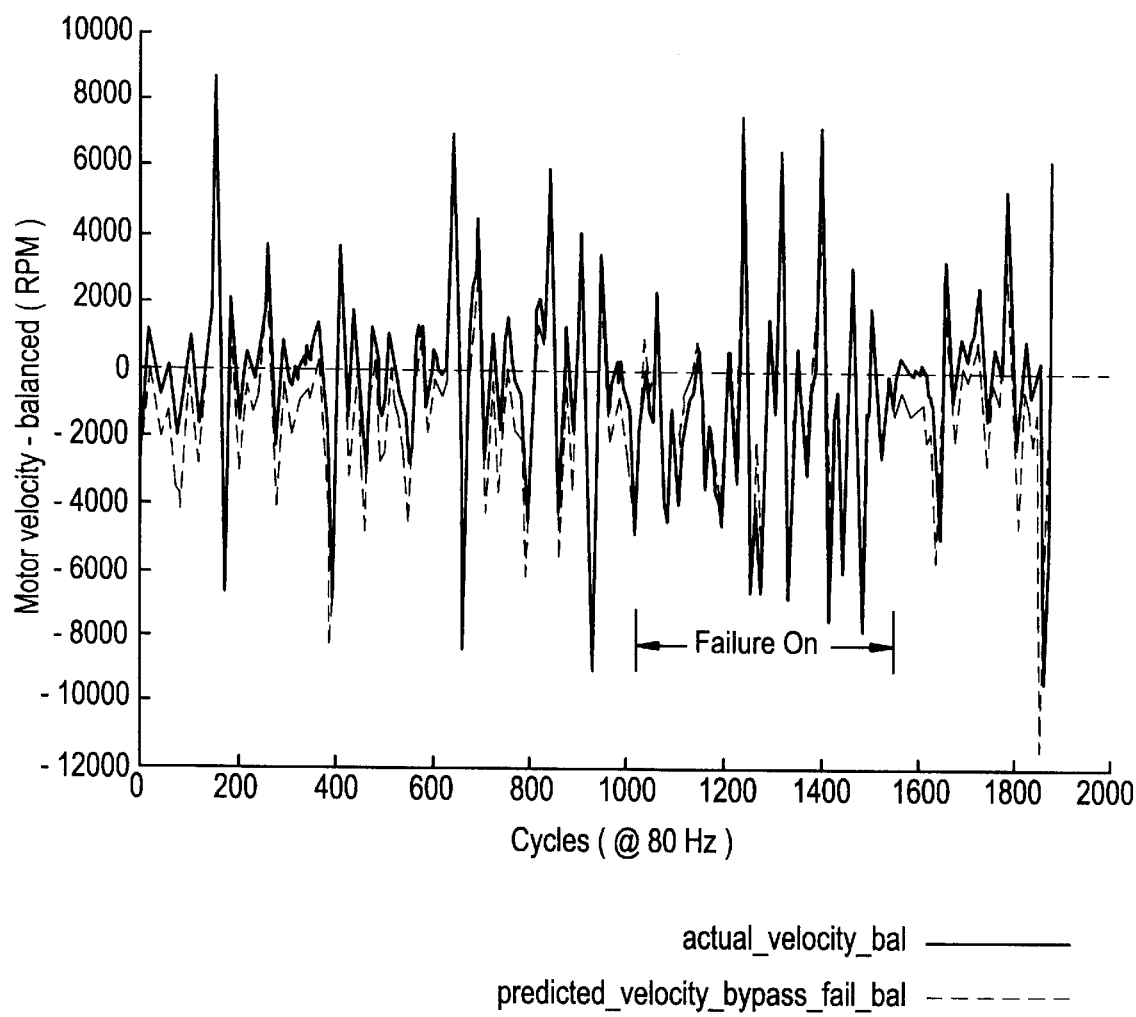

With reference now to FIGS. 2 and 3, an exemplary test application of the fault diagnostics system of the present invention will now be described. The system being monitored in the test application was an electric actuator powered by two hydraulic pumps and two electric motors. In order to test the operability of the fault diagnostics system, a pump leakage failure mode was invoked. FIG. 2 depicts the actual motor velocity versus the motor velocity predicted by the neural network performance model for the normal (no-fault) operating mode of the actuator. When the pump failure mode is present, the actual motor velocity deviates from the predicted motor velocity by more than a prescribed amount, as indicated by the "Failure On" legend in FIG. 2. FIG. 3 depicts the actual motor velocity versus the motor velocity predicted by the neural network performance model for the pump failure mode of the actuator. As can be seen, the actual motor velocity closely agrees with ("matches") the predicted motor velocity when the pump failure mode is present, as indicated by the "Failure On" legend in FIG. 3. This permits identification of the pump as the failed component.

Based upon the above and foregoing description of the preferred embodiment of the present invention, it will be appreciated by those skilled in the pertinent art that the neural network fault diagnostics system of the present invention provides many advantages and benefits over the presently available fault diagnostics systems, including, but not limited to, those enumerated below:

1) Because the neural network fault diagnostics system of the present invention models both the normal operating mode and the failure modes of the subsystems (or components) of the monitored (host) system, much more accurate fault identification is made possible, thereby permitting more accurate and specific identification of faulty components. Of course, this minimizes unnecessary component replacements.

2) Because the neural network fault diagnostics system of the present invention continually (dynamically) models the normal operating mode and the failure modes of the subsystems of the monitored system, the system has the capability of identifying slight changes in performance that indicate that a particular subsystem(s) is (are) gradually failing. Of course, this facilitates early identification of potentially catastrophic failures before they occur and minimizes the down time of the host system.

3) The neural network subsystem performance models can be implemented in software run on high speed digital processors that are specifically designed for neural networks, so that many neural networks can be computed in the same processor in a very short time period. For example, in a test version of the fault diagnostics system of the present invention, a CNAPS processor that can process up to 1,000 neural networks in a 20 Hz time frame was utilized. Of course, this permits a single processor to monitor many different subsystems.

4) Because the neural networks can be trained from data obtained from actual system operation, there is no need to construct design models and conduct failure analysis for the built-in-test logic design as in presently available fault diagnostics systems. Of course, this signficantly reduces the cost of development of the fault diagnostic system relative to the presently available technology.

5) Because a comparison voting (or statistical data interpretation) strategy is employed to compare actual versus predicted performance over a period of time, the likelihood that transient phenomena will cause false alarm reports to be made is dramatically reduced.

6) The neural network fault diagnostics system of the preferred embodiment of the present invention has the capability to detect failures even when no specific neural network failure mode performance model is available by comparing actual system performance versus the system performance predicted by the neural network normal operating mode performance model.

A presently contemplated application of the neural network fault diagnostics system of the present invention is for an aircraft which includes such subsystems as actuation components, engines, hydraulic systems, brake systems, flight control systems, and radar systems whose operating condition must be monitored on a continual basis during operation of the aircraft to ensure the safety and operational efficiency of the aircraft.

Other exemplary applications of the fault diagnostics system of the present invention include heavy equipment such as earth moving equipment, locomotives, and ships, power stations such as electric and nuclear power plants, wind turbines, automobiles, and appliances. Broadly, any system (or apparatus) which can incorporate a digital processor is a suitable candidate for using the neural network fault diagnostics system of the present invention.

Although the present invention has been described hereinabove in connection with a presently preferred embodiment thereof, it should be clearly understood that many variations and/or modifications of the basic inventive concepts taught herein which may appear to those skilled in the pertinent art will still fall within the spirit and scope of the present invention as defined in the appended claims.

What is claimed is:

1. A fault diagnostics system for monitoring the operating condition of a host system which includes a plurality of subsystems, comprising:

neural network means for modeling the performance of each subsystem in a normal operating mode and a plurality of different possible failure modes;

comparator means for comparing the actual performance of each subsystem with the modeled performance thereof in each of the normal and possible failure modes; and, processing means for making a determination of the operating condition of the host system on the basis of the comparisons made by the comparator means.

2. The fault diagnostics system as set forth in claim 1, wherein the neural network means dynamically models the performance of each subsystem in response to dynamically changing operating conditions.

3. The fault diagnostics system as set forth in claim 2, wherein the neural network means, the comparator means, and the processing means are implemented in software running on a digital processor.

4. The fault diagnostics system as set forth in claim 3, wherein the digital processor comprises a neural network processor.

5. The fault diagnostics system as set forth in claim 2, wherein the processing means is programmed to make a determination of the operating condition of the host system on the basis of a statistical analysis of the comparisons made by the comparator means.

6. The fault diagnostics system as set forth in claim 2, further comprising sensor means coupled to components of each of the subsystems for generating feedback signals indicative of the dynamically changing operating conditions.

7. The fault diagnostics system as set forth in claim 1, wherein the processing means is programmed to make a determination of the operating condition of the host system on the basis of a statistical analysis of the comparisons made by the comparator means.

8. The fault diagnostics system as set forth in claim 1, wherein the host system comprises an aircraft.

9. The fault diagnostics system as set forth in claim 1, wherein the processing means is programmed to employ a comparison voting technique to make a determination of the operating condition of the host system.

10. The fault diagnostics system as set forth in claim 1, wherein:

the comparator means is programmed to make a plurality of comparisons between the actual performance of each subsystem and the modeled performance of the normal operating mode thereof, during a prescribed first time interval;

the processing means is programmed to determine, for each subsystem, whether or not there is a prescribed level of agreement between a prescribed percentage of the comparisons made by the comparator means relative thereto during the prescribed first time interval, and to produce a first output signal indicative of a normal operating mode thereof if the determination is affirmative;

the comparator means is further programmed to make, for each subsystem determined to have a fault, a plurality of comparisons between the actual performance of each subsystem and the modeled performance of each failure mode thereof, during successive prescribed time intervals; and, the processing means is programmed to determine, for each subsystem, whether or not there is a prescribed level of agreement between a prescribed percentage of the comparisons made by the comparator means relative thereto during each of the successive second time intervals, and to produce a second output signal indicative of the particular failure mode, if any, which is determined to have occurred.

11. A method for monitoring the operating condition of a host system which includes a plurality of subsystems, comprising the steps of:

modeling the performance of each subsystem in a normal operating mode and each of a plurality of different possible failure modes;

comparing the actual performance of each subsystem with the modeled performance thereof in each of the normal and possible failure modes; and, determining the operating condition of the host system on the basis of the comparisons made in the comparing step.

12. The method as set forth in claim 11, wherein the modeling step is performed by constructing a neural network model of the normal operating mode and each of the plurality of different possible failure modes of each subsystem.

13. The method as set forth in claim 12, further comprising the step of dynamically predicting the performance of each subsystem based upon the response of each of the neural network models to dynamically changing operating conditions.

14. The method as set forth in claim 13, wherein the modeling step is performed by a neural network processor.

15. The method as set forth in claim 12, wherein the determining step is carried out by performing a statistical analysis of the comparisons made in the comparing step.

16. The method as set forth in claim 11, wherein the determining step is carried out by performing a statistical analysis of the comparisons made in the comparing step.

17. The method as set forth in claim 11, wherein the host system comprises an aircraft.

18. The method as set forth in claim 11, wherein the determining step is carried out by performing a comparison voting technique.

19. The method as set forth in claim 11, wherein the comparing and determining steps are carried out by:

making a plurality of comparisons between the actual performance of each subsystem and the modeled performance of the normal operating mode thereof, during a prescribed first time interval;

determining, for each subsystem, whether or not there is a prescribed level of agreement go between a prescribed percentage of the comparisons made during the prescribed first time interval, and indicating that the operating condition of the respective subsystem is normal if there is the prescribed level of agreement;

making a plurality of comparisons between the actual performance of each subsystem determined to have a fault and the modeled performance of each failure mode thereof, during successive prescribed time intervals; and, determining, for each subsystem, whether or not there is a prescribed level of agreement between a prescribed percentage of the comparisons made during each of the successive second time intervals, and indicating the particular failure mode, if any, which is determined to have occurred.

20. A fault diagnostics system for monitoring the operating condition of a host system which includes a plurality of subsystems, comprising:

neural network facilities for modeling the performance of each subsystem in a normal operating mode and a plurality of different possible failure modes;

facilities for comparing the actual performance of each subsystem with the modeled performance thereof in each of the normal and possible failure modes; and, facilities for making a determination of the operating condition of the host system on the basis of the comparisons made by the comparator facilities.

* * * * *